United States Patent [19]

Cartwright

[11] Patent Number: 4,468,424
[45] Date of Patent: Aug. 28, 1984

[54] FOOD WARMER

[76] Inventor: Robert B. Cartwright, 4536 Park Blvd., San Diego, Calif. 92103

[21] Appl. No.: 458,938

[22] Filed: Jan. 19, 1983

[51] Int. Cl.³ .......................................... A47G 23/04
[52] U.S. Cl. ................................ 428/103; 428/323; 428/326; 428/328
[58] Field of Search ................ 428/7, 66, 68, 77, 323, 428/326, 328; 426/77; 126/261; D6/293; D7/76

[56] References Cited

U.S. PATENT DOCUMENTS

| | | | |
|---|---|---|---|
| 880,784 | 3/1908 | Ferres | 428/533 X |
| 2,675,047 | 4/1954 | Andy | 428/323 X |
| 2,808,192 | 10/1957 | Raisin | 229/31 R |
| 2,859,489 | 11/1958 | Morrison | 428/119 X |
| 2,902,306 | 9/1959 | Reynolds | 428/464 X |
| 3,038,811 | 6/1962 | Reading | 428/131 X |
| 3,136,468 | 6/1964 | Keller | 229/3.5 M |
| 3,185,372 | 5/1965 | Ferraro | 229/3.5 M |
| 3,199,481 | 8/1965 | Handwerker | 428/102 X |
| 3,208,854 | 9/1965 | Hediger et al. | 426/77 |
| 3,554,770 | 1/1971 | Lipsky et al. | 426/107 |
| 3,836,064 | 9/1974 | Stillwagon | 428/213 X |
| 3,846,569 | 11/1974 | Kaplan | 426/77 |
| 3,862,876 | 1/1975 | Graves | 428/83 |
| 4,091,482 | 5/1978 | Malcolm | 428/328 X |
| 4,190,757 | 2/1980 | Turpin et al. | 219/10.55 E |
| 4,216,256 | 8/1980 | Lindner | 428/66 |
| 4,291,077 | 9/1981 | Mundell | 428/68 X |
| 4,318,427 | 3/1982 | Cross, Jr. | 428/36 X |

OTHER PUBLICATIONS

Page From Section 2 HFD Retailing Home Furnishings, Jul. 30, 1979.

Primary Examiner—Henry F. Epstein
Attorney, Agent, or Firm—Brown & Martin

[57] ABSTRACT

A pair of similarly sized sheets of a pliant, heat resistant material such as cloth are stitched together in face to face relation. A quantity of unbound particulate material such as metal shavings or vegetable material is dispersed between the sheets. Stitching between the intermediate portions of the sheets defines a plurality of pockets so that the particulate material remains substantially dispersed over the area of the sheets. The particulate material preferably has sufficient thermal inertia so that the food warmer may be placed in an oven to heat the particulate material and thereafter wrapped about a portion of food to keep it warm during a meal.

2 Claims, 3 Drawing Figures

FOOD WARMER

BACKGROUND OF THE INVENTION

The present invention relates to apparatus for heating food, and more particularly, to a device in the nature of a thermal blanket which may be preheated in an oven and thereafter wrapped around a portion of food such as rolls to keep them warm on the table during a meal.

Generally, rolls, biscuits and other baked goods are preferably eaten warm. This presents a problem since they normally cool in their basket or other serving container while in transit from the kitchen to the table and prior their consumption. In some cases, the baked goods are wrapped in linen napkins in an effort to keep them warm for a longer period of time. However, the baked goods normally cool very rapidly even if wrapped in napkins. Electric warming trays may be utilized to keep bread warm, however, they occupy a significant amount of table space and require that an unsightly electric cord extend across the table.

U.S. Pat. No. 2,808,192 of Raisin discloses a food basket made of an inner ply of metallic foil, a middle ply of cardboard and an outer ply of resin.

U.S. Pat. No. 2,902,396 of Reynolds discloses a foil wrapping for food. A hermetic seal is provided.

U.S. Pat. No. 3,038,811 of Reading discloses a wrapper for foods to be boiled. The wrapper has a paper layer, a metallic foil vapor barrier, and spaced perforations.

U.S. Pat. No. 3,136,468 of Keller discloses a food pouch made of laminate material including a metal foil layer.

U.S. Pat. No. 3,185,372 of Perraro discloses a foil package for pre-cooked bacon. The package may be inserted into a toaster.

U.S. Pat. No. 3,554,770 of Lipsky et al discloses another foil package for bacon that may be inserted into a toaster. The package has an inner plastic layer, an intermediate metal foil layer and an outer electrically insulative layer.

U.S. Pat. No. 3,836,064 of Stillwagon discloses a foil product for heating food. Metal foil is coated on one surface with thermoplastic epoxy and on its other surface with thermosetting material.

Finally, U.S. Pat. No. 4,190,757 of Turpin et al discloses a microwave heating package which includes a metal foil sheet and an energy absorber.

None of the patented devices discussed above is suitable for keeping baked goods warm on the table.

SUMMARY OF THE INVENTION

Accordingly, it is the principal object of the present invention to provide a device for keeping food warm on the table during a meal.

Another object is to provide such a device which has a simple, inexpensive construction.

Another object is to provide such a device which is durable.

Another object is to provide such a device which does not require any electrical attachment.

According to the present invention, a pair of similarly sized sheets of a pliant, heat resistant material such as cloth are stitched together in face to face relation. A quantity of unbound particulate material such as metal shavings or vegetable material is dispersed between the sheets. Stitching between the intermediate portions of the sheets defines a plurality of pockets so that the particulate material remains substantially dispersed over the area of the sheets. The particulate material preferably has sufficient thermal inertia so that the food warmer may be placed in an oven to heat the particulate material and thereafter wrapped about a portion of food to keep it warm during a meal.

DESCRIPTION OF THE PREFERRED EMBODIMENTS

Figure 1:
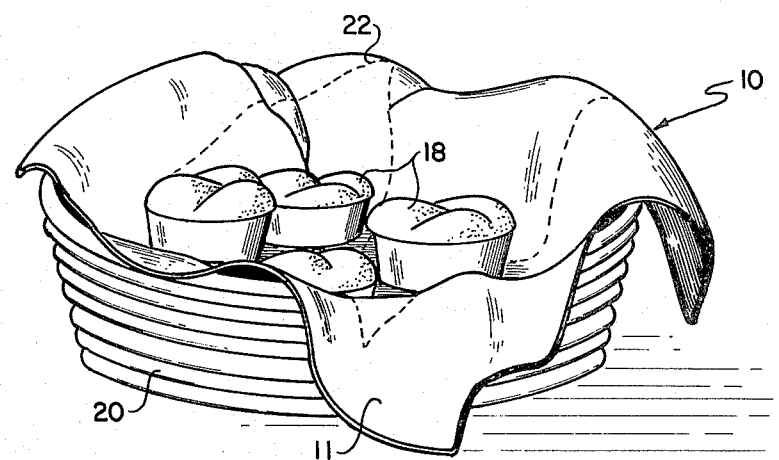
FIG. 1 illustrates a preferred embodiment of my invention which has been unwrapped from around a plurality of rolls supported in a serving basket.
Figure 2:
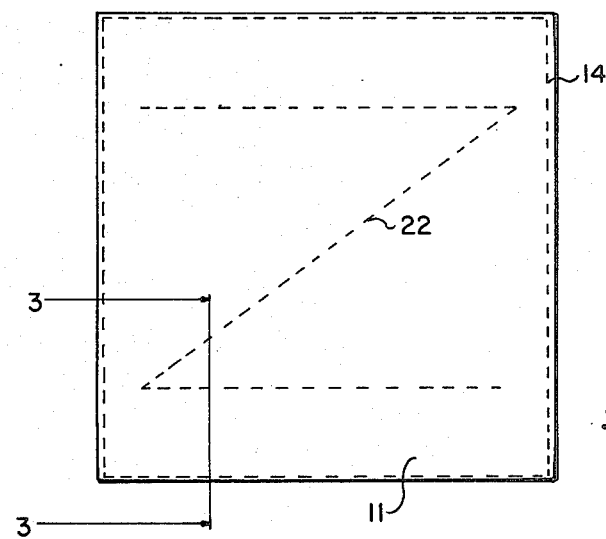
FIG. 2 is a reduced, plan view of the preferred embodiment of my food warmer wherein stitching is illustrated in dashed lines.
Figure 3:
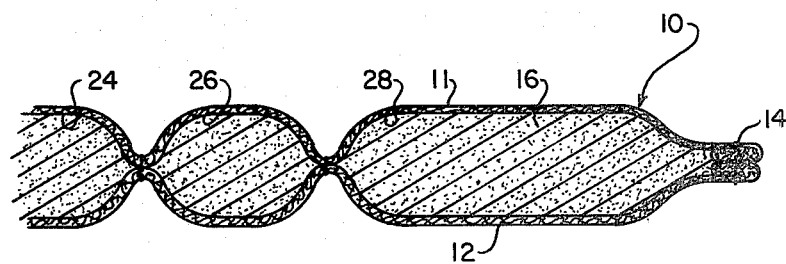
FIG. 3 is an enlarged, fragmentary, sectional view of the preferred embodiment of my food warmer taken along line 3—3 of FIG. 2.

Referring collectively to FIGS. 1, 2 and 3, the preferred embodiment 10 of my food warmer comprises a pair of similarly sized sheets 11 and 12 of a pliant heat resistant material joined together in face to face relation. The sheets are preferably fabric and their peripheral edges are folded inwardly and joined by stitching 14. A quantity of a particulate material 16 is dispersed between the sheets 11 and 12. This particulate material preferably has sufficient thermal inertia so that the food warmer may be placed in an oven to heat the particulate material and thereafter wrapped about a portion of food such as rolls 18. The food warmer 10 enclosing the rolls 18 may then be placed within a serving basket 20. The heat of the particulate material 16 thus serves to keep the rolls warm during a meal.

Stitching 22 joins the sheets 11 and 12 together between their peripheries and divides the compartment defined between the sheets into a plurality of individual pockets such as 24, 26 and 28. Each of these pockets is filled with the particulate material 16. The stitching 22 thus serves to insure that the particulate material is somewhat evenly dispersed over the area of the sheets.

The particulate material may comprise metal shavings. Alternatively, the particulate material may comprise vegetable matter such as spent coffee grounds. The particulate material may also comprise a mixture of metal shavings and vegetable material.

In use, the food warmer may be placed in an oven at 400° F. for approximately three to five minutes. The food warmer is thereafter wrapped around the food to be served, in a manner similar to wrapping a linen napkin about hot rolls.

Besides cloth, the sheets 11 and 12 may comprise a heat resistant paper material, metal foil or a heat resistant polymer. The paper, metal foil and polymer sheets, respectively, may join along their peripheral edges and in their intermediate portions to define the pockets in any conventional manner suitable for such materials.

Having described preferred embodiments of my food warmer, it should be apparent to those skilled in the art that my invention may be further modified in both arrangement and detail. For example, depending on the sheet material, the sheets might be glued together in lieu of stitching. Accordingly, the protection afforded my invention should be limited only in accordance with the scope of the following claims.

I claim:

1. A food warmer comprising:
   a pair of dinner table napkin-sized sheets of pliant, heat-resistant cloth material that is suitable for wrapping around a portion of food on a dinner table;
   means for joining the sheets together in face-to-face relation, including stitching along the peripheral edges and across the intermediate portions of the sheets to define a plurality of pockets between the sheets for containing a quantity of unbound particulate material and for insuring that the particulate material is disbursed over the areas of the sheets; and
   a quantity of unbound particulate material disbursed over the areas of and between the sheets, the particulate material being vegetable matter with a sufficient thermal inertia to absorb heat from an oven used for cooking food and maintain apart from the oven an elevated temperature relative to the ambient temperature at the dinner table for a period of time so that the sheets and particulate material may be wrapped about a portion of food to keep the food warm during a meal;
   wherein the food warmer can be preheated in an oven and then wrapped about a protion of food to keep the food warm on the table during a meal.
2. A food warmer according to claim 1 wherein the vegetable matter is coffee grounds.